May 1, 1962   R. W. E. MOSSE   3,031,812
CAN WRAPPING MACHINES
Filed Feb. 25, 1960   10 Sheets-Sheet 1
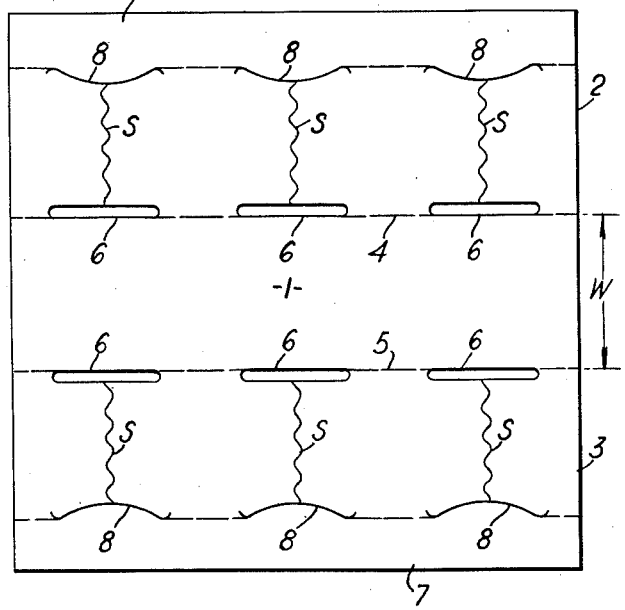
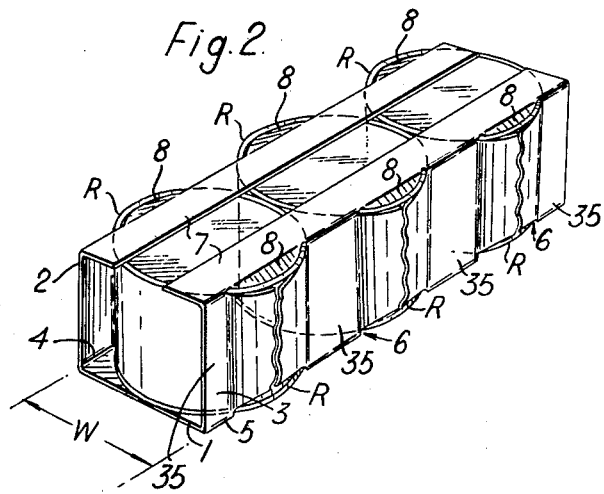
Inventor
RICHARD W. E. MOSSE
By
Attorneys Inventor
RICHARD W. E. MOSSE
By Mirie & Smiley
Attorneys May 1, 1962 R. W. E. MOSSE 3,031,812
CAN WRAPPING MACHINES
Filed Feb. 25, 1960 10 Sheets-Sheet 3

Inventor
RICHARD W. E. MOSSE
By
Attorneys

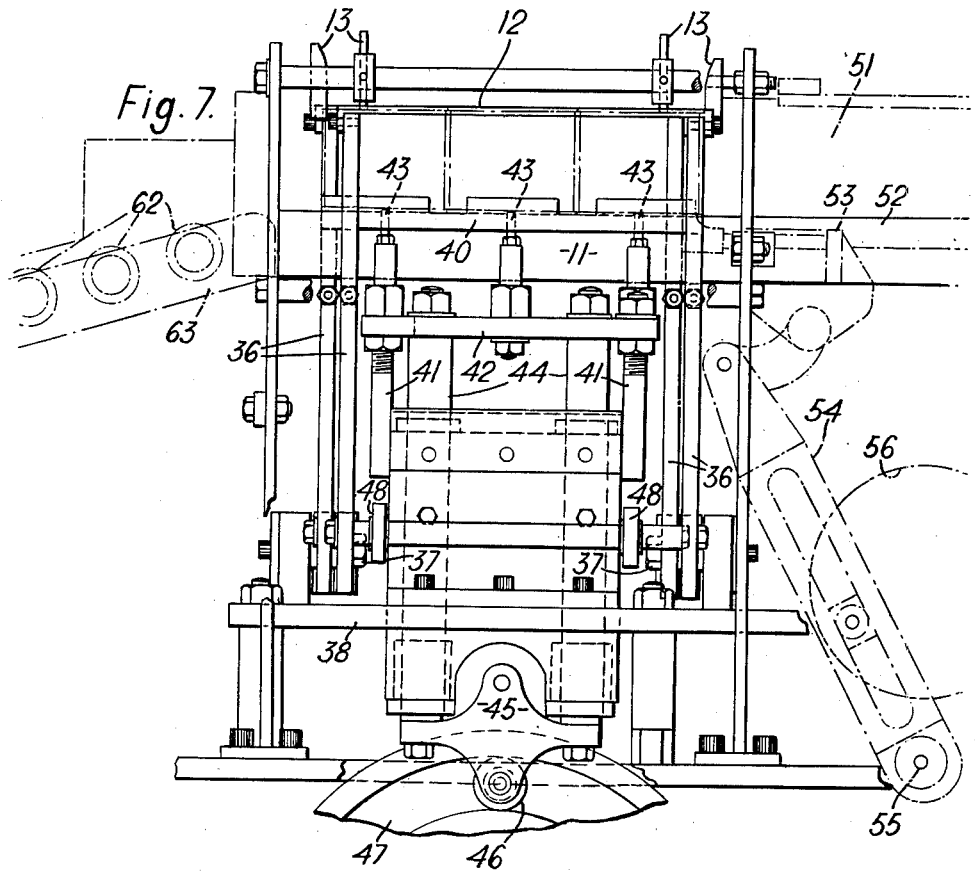
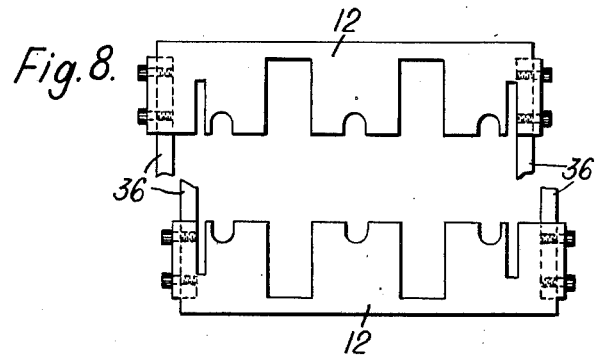

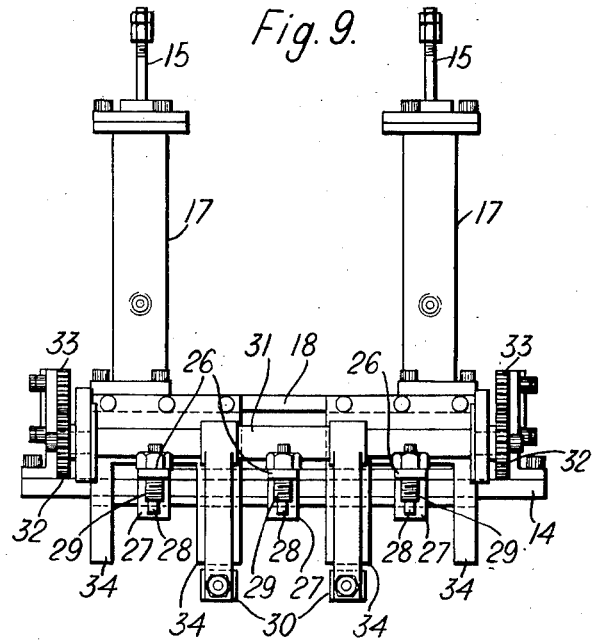
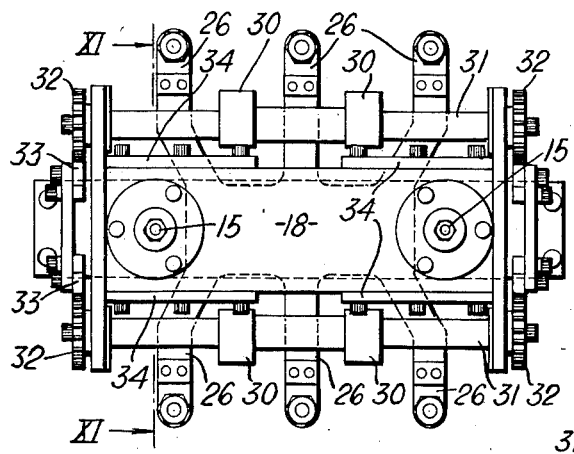
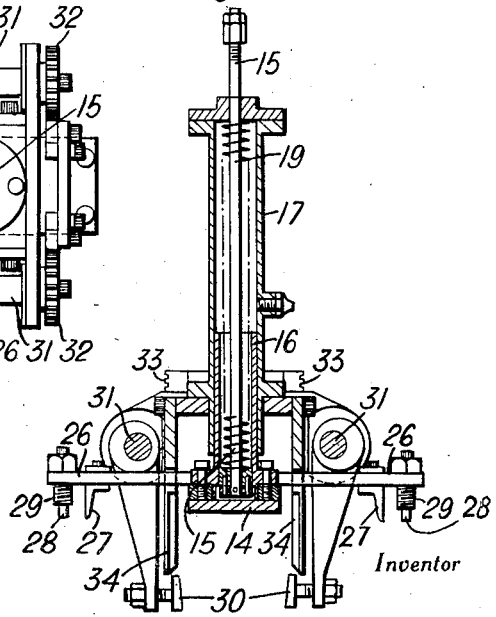
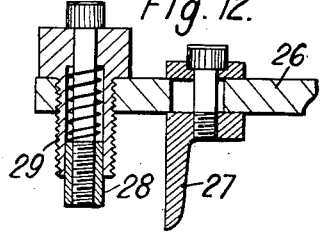

May 1, 1962 R. W. E. MOSSE 3,031,812
CAN WRAPPING MACHINES
Filed Feb. 25, 1960 10 Sheets-Sheet 8

Inventor
RICHARD W. E. MOSSE
By Imirie & Smiley
Attorneys

May 1, 1962   R. W. E. MOSSE   3,031,812
CAN WRAPPING MACHINES
Filed Feb. 25, 1960   10 Sheets-Sheet 9

Inventor
RICHARD W. E. MOSSE
By *Imirie & Smiley*
Attorneys

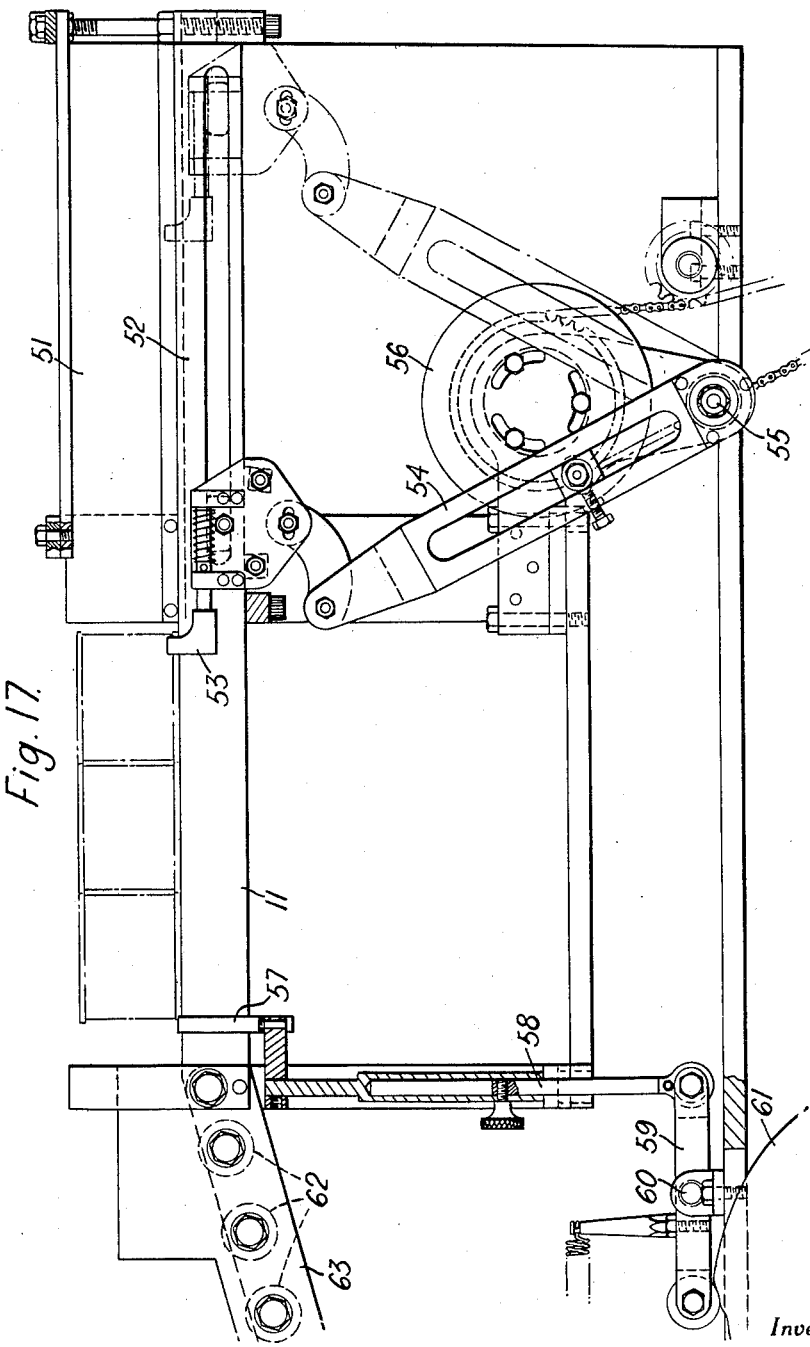

United States Patent Office 3,031,812
Patented May 1, 1962

3,031,812
CAN WRAPPING MACHINES
Richard Wolfgang Emil Mosse, London, England, assignor to The Metal Box Company Limited, London, England, a British company
Filed Feb. 25, 1960, Ser. No. 11,015
14 Claims. (Cl. 53—128)

This invention relates to a machine for wrapping cans in a cardboard wrapper and it is a main object of the invention to provide a machine which will automatically wrap a row of cans in an open-ended wrapper in a manner such that the wrapper and cans are retained in position relative one to the other by co-operation of tongues formed in the wrapper with the rims at the ends of the cans.

According to one embodiment of the invention a machine for wrapping a row of cans in an open-ended cardboard wrapper comprises a support on which a row of cans to be wrapped are supportable with bottom rim portions of the cans extending beyond opposite sides of the support, means to engage the base panel of a wrapper blank with the upper ends of the row of cans, means to fold walls hinged one to each of two opposite sides of the base panel downwards against the sides of the row of cans, means to fold end portions of the walls against the exposed bottom rim portions of the cans, and means to insert tongues formed in said walls into the bottom rims of the cans to engage the inner sides of the rims and thereby retain the wrapper about the cans and constrain the cans against movement relative to said base panel and walls of the wrapper.

Figure 3:
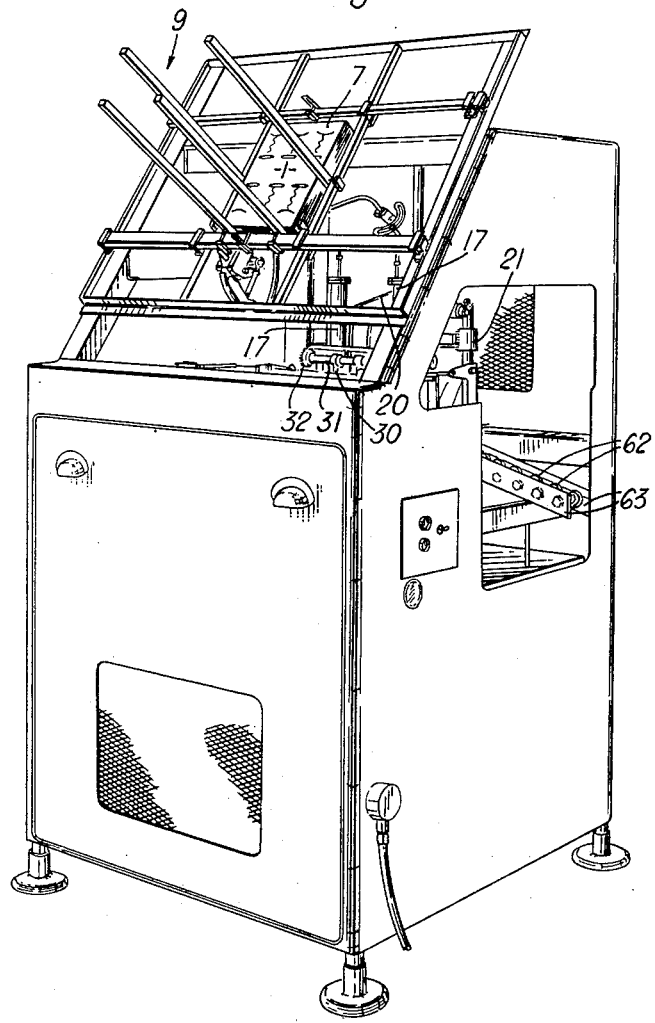
Figure 4:
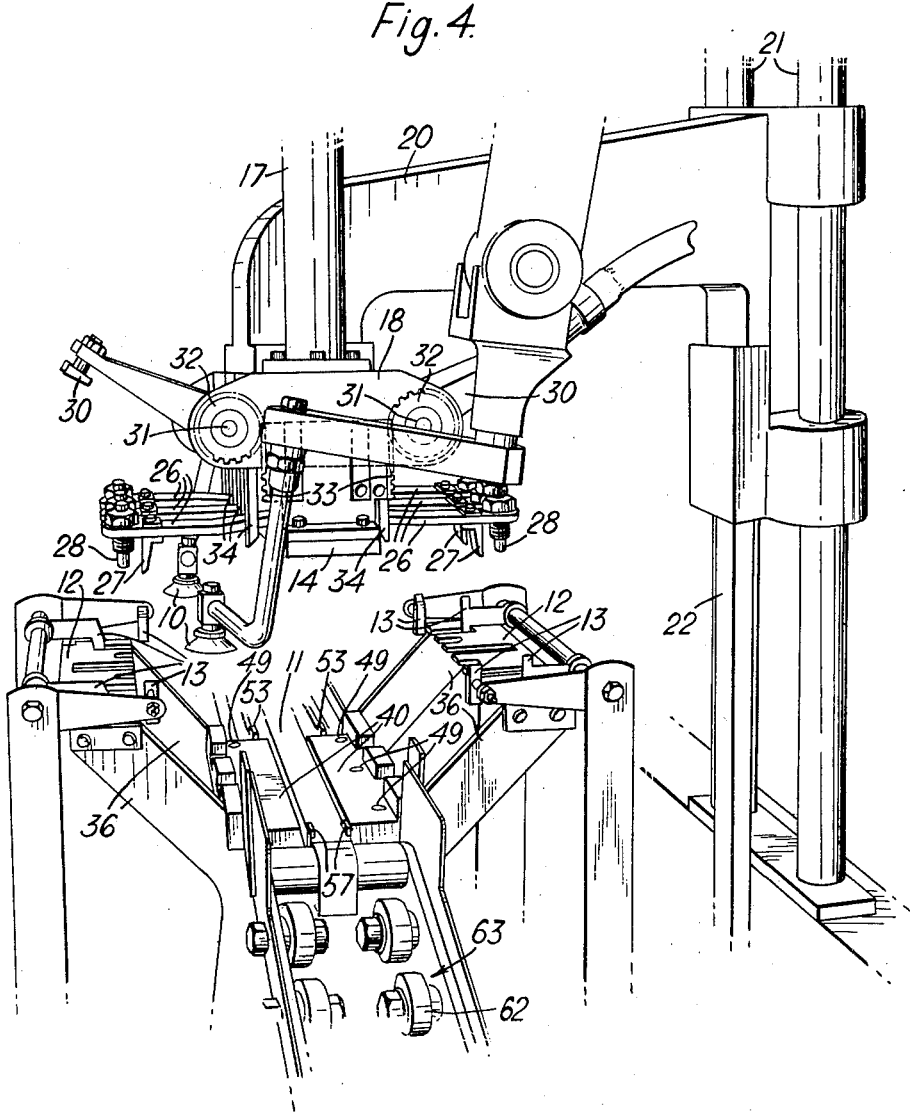
Figure 5:
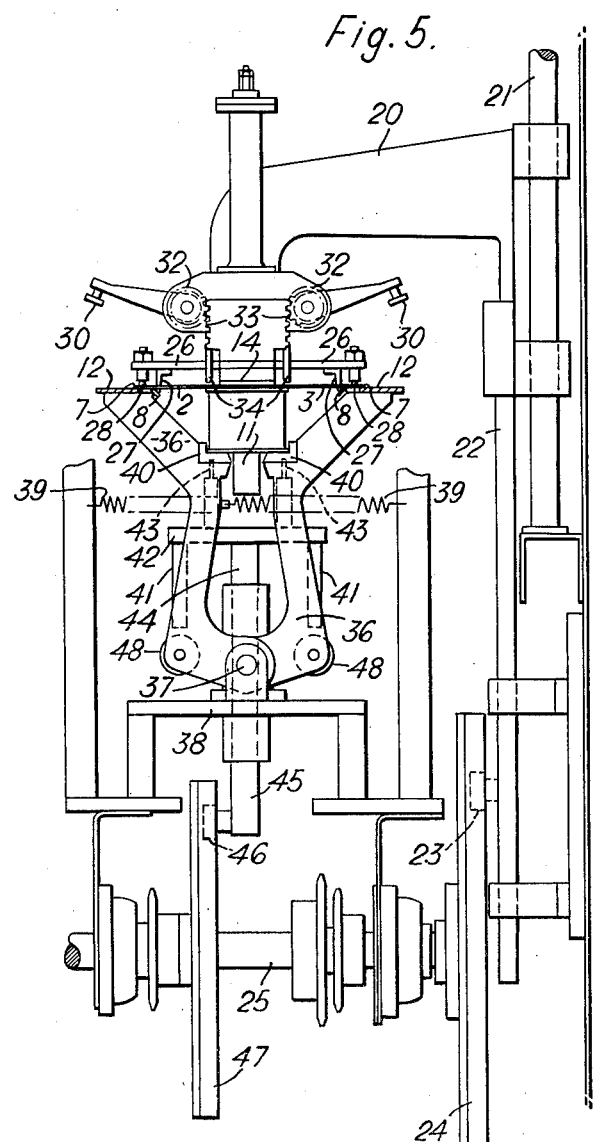
Figure 6:
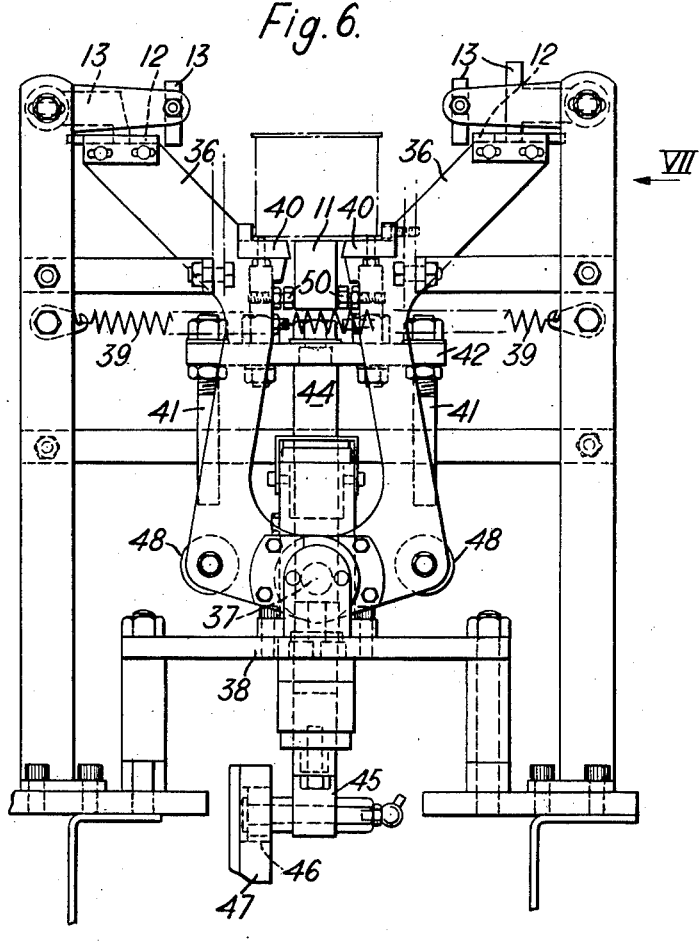
Figure 14:
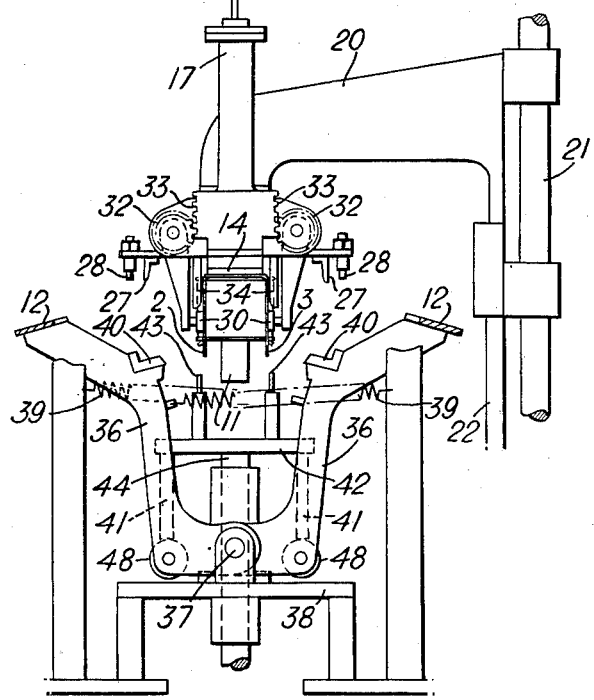
Figure 13:
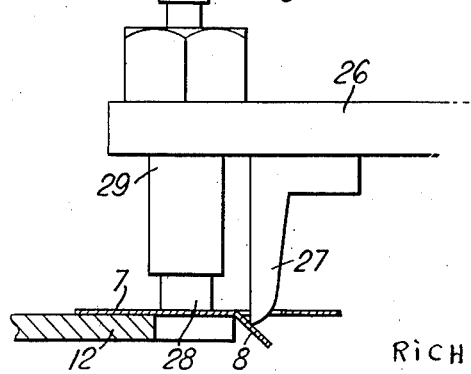
Figure 15:
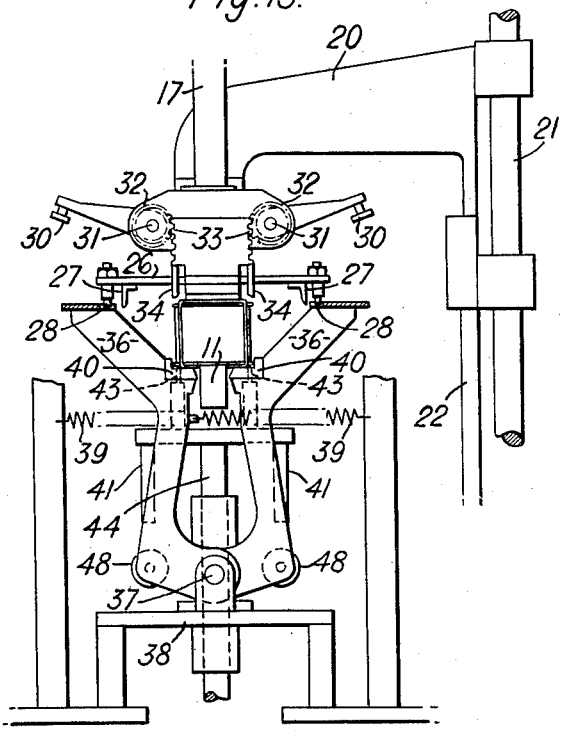
Figure 16:
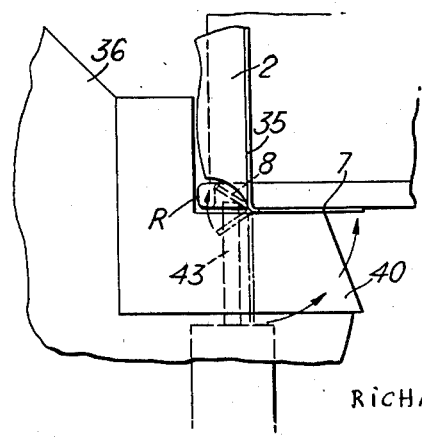

In order that the invention may be clearly understood one embodiment thereof will now be described, by way of example, with reference to the accompanying drawings, in which:

FIG. 1 is a plan of a cardboard wrapper blank to enclose a row of cans,

FIG. 2 is a perspective view of the wrapper folded about a row of cans by a machine according to the invention, FIG. 3 is an external perspective view of a machine according to the invention, FIG. 4 is a perspective view of apparatus for locating a blank on a row of cans and for folding the blank about the row, FIG. 5 is a diagrammatic elevation of the apparatus at the commencement of a wrapping cycle, FIG. 6 is an elevation of a part of the apparatus shown in FIG. 5, FIG. 7 is a view looking in the direction of arrow VII, FIG. 6, FIG. 8 is a top plan of blank-engaging members illustrated in others of the figures, FIG. 9 is an elevation of upper blank-folding mechanism, FIG. 10 is a top plan of FIG. 9, FIG. 11 is a section on line XI—XI, FIG. 10, FIG. 12 shows a detail of FIG. 11 to an enlarged scale, FIG. 13 illustrates the pre-folding of tongues formed in the wrapper blank, FIG. 14 illustrates diagrammatically an intermediate stage in the wrapping cycle, FIG. 15 illustrates diagrammatically the positions of the parts of the wrapping apparatus at the end of a wrapping cycle, FIG. 16 illustrates the manner of inserting the tongues of a wrapper blank into the rims of cans wrapped in the blank, and FIG. 17 illustrates apparatus for feeding rows of cans to and from the position at which a row is wrapped in a wrapper blank.

Referring to FIGS. 1 and 2, FIG. 1 illustrates a wrapper blank made from cardboard or similar material and comprises a base panel 1 having two walls 2 and 3 hinged one to each of the opposite sides 4, 5 of the base panel. The walls 2 and 3 are each provided with three openings 6 which are arranged in side-by-side relation and which, as can be seen from FIG. 2, are aligned with each other when the walls 2, 3 are folded against the sides of a row of cans. The width W of the base panel is less than the diameter of the end of a can and the openings 6 permit the rims of can ends engaged by the base panel 1 to overlap the base panel as illustrated in FIG. 2.

As can be seen from FIG. 1 the openings 6 are each aligned with a tongue 8 formed by a slit in the walls 2 or 3, the tongues extending into the main portions of walls 2, 3 from end portions 7 thereof which are hingedly connected to the main wall portions between the ends of the tongue-forming slits. The portions of the blank which extend between the openings 6 and the tongues 8 are each provided with a wavy slit S which extends between the tongues 8 and apertures 6 aligned therewith.

As can be seen from FIG. 2 when the blank is wrapped about a row of cans the rims R of the cans at one end thereof protrude through the openings 6. The wrapper is retained in position about the row of cans and the cans are prevented from movement relative to the wrapper by folding the end portions 7 of the walls 2, 3 against the ends of the cans remote from the base panel 1 as shown in FIG. 2, and by inserting the tongues 8 into the rims of the cans so that they engage the rims at opposite sides thereof and make a firm frictional grip therewith thus to retain the end portions 7 in the positions thereof illustrated in FIG. 2.

FIGS. 3 to 17 illustrate a machine according to the invention for folding wrapper blanks as illustrated in FIG. 1 about a row of cans, and the blanks are contained as a stack in a magazine 9, FIG. 3, from which they are removed, one at a time, in known manner by suckers 10, FIG. 4, and deposited over a row of cans resting on a stationary support 11. The blank is so positioned over the row of cans that the base panel 1 overlies the top ends of the cans, see FIG. 5, and the opposite end portions of the blank rest on blank-engaging members 12, FIGS. 4 to 8. The blanks are also located in position by locating elements 13, FIGS. 4 and 6, which engage the four sides of the blank.

Just after the blanks are located above the row of cans, a presser member 14 made of resilient material, for example rubber, is caused to press the base panel 1 against the tops of the row of cans. The presser member 14 is carried at the ends of rods 15, FIGS. 9 to 11, movable with sleeves 16, FIG. 11, about which tubes 17 are slidable axially. The tubes 17 support a carriage 18 and springs 19, FIG. 11, permit axial relative movement between the carriage 18 and the presser member 14 when the presser member is engaged with the base panel 1 of a blank disposed on the tops of a row of cans. The tubes 17 and carriage 18 are carried by an arm 20, FIG. 4, supported for reciprocation on suport rods 21. The arm 20 has an operating bar 22, FIGS. 4 and 5, connected thereto and to the bar 22 is secured a cam follower 23, FIG. 5, which co-operates with a track cam 24 supported for rotation with the main shaft 25 of the machine.

Mounted on the carriage 18 are arms 26 each of which is provided with tongue breaking elements 27. Also carried by arms 26 are auxiliary presser elements 28 which are resiliently mounted, see FIG. 11, in housings 29 carried by the arms 26. When the tube 17 is moved downwards towards the row of cans the presser member 14 is, as stated above, engaged with the base panel 1 of the blank and presses this panel against the top ends of the cans, the presser member thereupon being arrested while the carriage 18 continues its downward movement so that the auxiliary presser members 28 lightly press the outer portions of the blank against the blank engaging members 12 while the tongue-breaking elements 27 fold the tongues downwardly about the edges of members 12 as illustrated in FIG. 13. The blank-engaging members 12 are thereupon disengaged from the blank, as will be described below, and continued downward movement of the carriage causes wall-folding elements 30 to effect folding of the walls 2, 3 downwards into engagement with the sides of the row of cans.

The wall-folding elements 30 are movable in arcuate paths about the axes of shafts 31 rotatable in the carriage 18. To each end of each of the shafts 31 there is secured a pinion 32 which meshes with a toothed rack 33 movable with the pressure member 14. Thus, as the presser member 14 and racks 33 are stationary the continued downward movement of the carriage 18 causes the wall-folding elements 30 to be swung downwards from the position thereof shown in FIGS. 4 and 5 to the position thereof shown in FIGS. 11 and 14 to effect the folding of the walls 2, 3 against the sides of the row of cans. Also carried by the carriage 18 are wall-engaging members 34 which engage the walls 2, 3 between the adjoining cans and press the wall portions so engaged inwards so that they assume the positions thereof illustrated at 35, FIG. 2.

The blank-engaging members 12 are supported by rocking arms 36 mounted on pivots 37 supported on a bridge piece 38. The pivots 37 are co-axial and are located beneath the stationary support 11 and springs 39 urge the rocking arms to the position thereof illustrated in FIGS. 6 and 15 and at which a blank is engaged by the blank-engaging members 12. Also carried by the rocking arms 36 for movement therewith are end-folding elements 40 which, on inward movement of the rocking arms 36 towards the support 11, engage the end portions 7 of the wrapper walls 2, 3 and fold them beneath the row of cans to engage the exposed bottom rim portions of the cans as illustrated in FIG. 15. The rocking arms 36 are moved against the action of their springs 39 to withdraw the blank-engaging members from beneath a blank by actuating means which consist of rods 41 carried by a movable support 42 mounted form movement towards and away from the stationary support 11. The movable support 42 also carries tongue-inserting elements 43 arranged, following the infolding of the end portions 7 of the wrapper walls 2, 3 against the exposed rim portions of the bottoms of the cans, to move the tongues 8 into the rims at the bottoms of the cans to engage the inner sidse of the rims as illustrated in FIG. 2 and thereby retain the wrapper about the cans and constrain the cans agianst movement relative to the base panel 1 and walls 2, 3 of the wrapper. The movable support 42 is carried by rods 44 which extend upwards from a yoke 45 provided with a cam follower 46 which co-operates with a cam 47 rotatable with the main shaft 25.

An operating cycle commences at a time when a row of cans is moved on to the stationary support 11 at which time the end-folding elements 40 are located in the innermost positions thereof as illustrated in FIG. 5 and the tongue inserting elements 43 have commenced their downward movement and are withdrawn below the upper faces of the end-folding elements 40. At this time a blank is deposited on the top of the row of cans and has its end portions 7 engaged by the blank-engaging members 12 and the presser member 14 is caused to engage the blank and press it against the tops of the cans. Next, as described above, the tongue-breaking elements 27 perform the initial folding operation of the tongues against the edges of the members 12, FIG. 13, and as this action is completed, the rods 41 engage rollers 48 carried by the rocking arms 36 thereby to effect rocking of the arms about their pivots 37 away from the stationary support 11 to the position illustrated in FIG. 14 at which position the blank-engaging members 12 are disengaged from the blank and the end-folding elements 40 are moved to a position at which they will not obstruct the downward movement of the wrapper walls 2, 3 into engagement with the sides of the cans. Next the wall-folding elements 30 are rotated downwards to fold the wrapper walls 2, 3 downwards into engagement with the sides of the row of cans and the wall-engaging members 34 press inwards the portions 35 of the walls of the wrapper.

While the presser element 14 remains engaged with the base panel 1 and the wall-engaging members 34 with the downwardly folded walls 2, 3 the movable support 42 commences to rise and releases the rocking arms 36, this occurring before the tongue-inserting elements 43 are moved through the slots 49, FIG. 4, provided therefor in the end-folding elements 40 so that the springs 39 cause the rocking arms 36 to move towards each other so that the end-folding elements 40 move the end portions 7 of the walls 2, 3 into engagement with the exposed rim portions at the bottom of the row of cans. Just after the folding of the end wall portions 7 the tongue-inserting elements 43 engage the tongues 8 and insert them into the rims of the cans as described above and as illustrated in FIGS. 15 and 16. As soon as the tongues have been infolded, the tongue-inserting elements 43 commence their return movement and the next cycle commences. Adjustable stops 50, FIG. 6, movable with the rocking arms 36 co-operate with the stationary support 11 and determine the extent of movement of rocking arms 36 towards each other.

Cans are fed to the wrapping position along a channel 51, FIGS. 4 and 7, and are located on a stationary support 52, FIG. 7, formed in extension of the stationary support 11. The row of cans is moved along the support 52 to the wrapping position by pusher elements 53, FIGS. 7 and 17, which are carried by an arm 54 rockable about a pivot 55 by a cam 56. The row of cans is located in the wrapping position by stops 57 carried by arms 58 connected to rocking arms 59 for rocking movement about a pivot 60 by a cam 61 mounted on the main shaft 25. The stops 57 cooperate with the stationary support 11 and in the raised position thereof the stops 57 project into the path of cans moved by the pusher elements 53 so that the row of cans moved by the pushers is arrested by the stops and when this occurs the pushers 54 are tripped out of engagement with the cans and are restored by the arm 54 to the starting position thereof. The stops 57 remain in the raised positions thereof until folding of a wrapper about the row of cans has been completed and they are lowered out of the path of the row of cans just before a succeeding row of cans is moved to the wrapping position by the pushers 53. Thus, it will be understood that a wrapped row of cans is removed from the wrapping position by the movement of an unwrapped row of cans to the wrapping position and the wrapped row is ejected from the wrapping position and is delivered on to rollers 62 supported by downwardly inclined frames 63. The wrapped row descends over the rollers 62 and is delivered thereby to any suitable position.

It will be understood that many modifications may be made to the apparatus as described above, for example although it is preferred to effect pre-folding of the tongues 8, as described above, because this pre-folding is found to be of considerable advantage when the tongues are ultimately inserted into the rims of the row of cans, as described above, it is not essential that pre-folding of the tongues be effected and, if desired, the tongue-breaking elements may be dispensed with and folding of the tongues be effected entirely by the tongue-inserting elements 43.

I claim:

1. A machine for wrapping a row of cans in a cardboard wrapper, comprising a stationary support for a row of cans, means to position a flat wrapper blank on the tops of the row of cans on the support with a base panel of the blank overlying the tops of the cans, a presser member located over said support and reciprocable towards and away therefrom to press said base panel against the tops of the row of cans on the support, tongue-breaking elements and wall-folding elements movable with and relative to said presser member respectively to effect the breaking of tongues formed in walls hinged one to each of the opposite sides of the base panel before folding of the walls about their hinges and to hold the walls downwards about their hinges against opposite sides of the cans, end-folding elements operable in timed relation with said presser member to fold end portions of said walls against the rims at the bottoms of the cans, and tongue-inserting elements operable in timed relation with the end-folding elements to move said tongues into the rims to engage the inner sides of the rims and thereby retain the wrapper about the cans and constrain the cans against movement relative to said base panel and walls of the wrapper.

2. A machine according to claim 1, including blank engaging members engageable with the underside of a wrapper blank resting on the tops of a row of cans, said blank-engaging members being supported for rocking movement towards and away from opposite sides of the support in timed relation with the movement of the presser member to withdraw the blank-engaging members from beneath the blank prior to the folding of said walls by the wall-folding elements.

3. A machine according to claim 2, including resilient auxiliary blank pressers, one for each tongue-breaking element, movable with the presser member and operable to press the blank against the upper surfaces of the blank-engaging members during breaking of the tongues by the tongue-breaking elements about edge portions of the blank-engaging members.

4. A machine according to claim 3, wherein the tongue-breaking elements are supported for movement relative to the presser member in the direction of movement thereof by a reciprocable carriage, and wherein the wall-folding elements are movable in arcuate paths about the longitudinal axes of shafts rotatable in said carriage, each said shaft being rotatable by co-operation of pinions secured thereto and meshing with toothed racks carried by the presser member.

5. A machine according to claim 4, wherein the end-folding elements are movable with the blank-engaging members.

6. A machine according to claim 5, including rocking arms which support the blank-engaging members and the end-folding elements for rocking movement about and axis common thereto and located beneath the support, springs urging the rocking arms to the position thereof at which a blank is engaged by the blank-engaging members, and actuating means operable to effect rocking of the rocking arms away from the support against the action of said springs thereby to cause movement of the end-folding elements from beneath a blank pressed against the tops of the row of cans.

7. A machine according to claim 6, including a movable support for the tongue-inserting elements, said movable support being mounted for movement towards and away from the stationary support, and a rotatable cam co-operating with the movable support to effect reciprocation thereof.

8. A machine according to claim 7, wherein said actuating means for the rocking arms comprises rods carried by and depending from the movable support for co-operation with the rocking arms during movement of the movable support away from the stationary support thereby to effect rocking of the rocking arms against the action of said springs.

9. A machine for wrapping a row of cans in a cardboard wrapper, comprising a stationary support for a row of cans, means to position a flat wrapper blank on the tops of the row of cans on the support with a base panel of the blank overlying the tops of the cans, a presser member located over said support and reciprocable towards and away therefrom to press said base panel against the tops of the row of cans on the support, wall-folding elements operable following engagement of the presser member with said base panel to fold downwards against the sides of the cans walls hinged one to each of the opposite sides of the base panel, blank-engaging members engageable with the underside of a wrapper blank resting on the tops of a row of cans, said blank-engaging members being supported for rocking movement towards and away from opposite sides of the support in timed relation with the movement of the presser member to withdraw the blank-engaging members from beneath the blank prior to the folding of said walls by the wall-folding elements, end-folding elements operable in timed relation with said presser member and wall-folding elements to fold end portions of said walls against the rims at the bottoms of the cans, and tongue-inserting elements operable in timed relation with the end-folding elements to move into the rims tongues formed in said walls and to engage the tongues with the inner sides of the rims to retain the wrapper about the cans and constrain the cans against movement relative to said base panel.

10. A machine for wrapping a row of cans in a cardboard wrapper, comprising a stationary support for a row of cans, means to position a flat wrapper blank on the tops of the row of cans on the support with a base panel of the blank overlying the tops of the cans, a presser member located over said support and reciprocable towards and away therefrom to press said base panel against the tops of the row of cans on the support, wall-folding elements movable, following engagement of the presser member with said base panel, in arcuate paths about the longitudinal axes of shafts rotatable in said carriage to fold downwards against the sides of the cans walls hinged one to each of the opposite sides of the base panel, a pinion rotatable with each said shaft, a toothed rack meshing with each pinion and carried by the presser member, blank-engaging members engageable with the underside of a wrapper blank resting on the tops of a row of cans, said blank-engaging members being supported for rocking movement towards and away from opposite sides of the support in timed relation with the movement of the presser member to withdraw the blank-engaging members from beneath the blank prior to the folding of said walls by the wall-folding elements, end-folding elements operable in timed relation with said presser member and wall-folding elements to fold end portions of said walls against the rims at the bottoms of the cans, and tongue-inserting elements operable in timed relation with the end-folding elements to move into the rims tongues formed in said walls and to engage the tongues with the inner sides of the rims to retain the wrapper about the cans and constrain the cans against movement relative to said base panel.

11. A machine for wrapping a row of cans in a cardboard wrapper, comprising a stationary support for a row of cans, means to position a flat wrapper blank on the tops of the row of cans on the support with a base panel of the blank overlying the tops of the cans, a presser member located over said support and reciprocable towards and away therefrom to press said base panel against the tops of the row of cans on the support, wall-folding elements movable, following engagement of the presser member with said base panel, in arcuate paths about the longitudinal axes of shafts rotatable in said carriage to fold downwards against the sides of the cans walls hinged one to each of the opposite sides of the base panel, a pinion rotatable with each said shaft, a toothed rack meshing with each pinion and carried by the presser member, blank-engaging members engageable with the underside of a wrapper blank resting on the tops of a row of cans, said blank-engaging members being supported for rocking movement towards and away from opposite sides of the support in timed relation with the movement of the presser member to withdraw the blank-engaging members from beneath the blank prior to the folding of said walls by the wall-folding elements, end folding elements movable with the blank-engaging members and operable in timed relation with said presser member and wall-folding elements to fold end portions of said walls against the rims at the bottoms of the cans, and tongue-inserting elements operable in timed relation with the end-folding elements to move into the rims tongues formed in said walls and to engage the tongues with the inner sides of the rims to retain the wrapper about the cans and constrain the cans against movement relative to said base panel.

12. A machine according to claim 11, including rocking arms which support the blank-engaging members and the end-folding elements for rocking movement about an axis common thereto and located beneath the support, springs urging the rocking arms to the position thereof at which a blank is engaged by the blank-engaging members, and actuating means operable to effect rocking of the rocking arms away from the support against the action of said springs thereby to cause movement of the end-folding elements from beneath a blank pressed against the tops of the row of cans.

13. A machine according to claim 12, including a movable support for the tongue-inserting elements, said movable support being mounted for movement towards and away from the stationary support, and a rotatable cam co-operating with the movable support to effect reciprocation thereof.

14. A machine according to claim 13, wherein said actuating means for the rocking arms comprises rods carried by and depending from the movable support for co-operation with the rocking arms during movement of the movable support away from the stationary support thereby to effect rocking of the rocking arms against the action of said springs.

References Cited in the file of this patent

UNITED STATES PATENTS

| | | |
|---|---|---|
| 2,351,596 | Brogden | June 20, 1944 |
| 2,751,730 | Gentry | June 26, 1956 |
| 2,803,932 | Nigrelli | Aug. 27, 1957 |
| 2,809,484 | Gentry | Oct. 15, 1957 |
| 2,809,486 | Gentry | Oct. 15, 1957 |
| 2,896,382 | Back | July 28, 1959 |
| 2,900,772 | Chidsey | Aug. 25, 1959 |

UNITED STATES PATENT OFFICE
CERTIFICATE OF CORRECTION

Patent No. 3,031,812            May 1, 1962

Richard Wolfgang Emil Mosse

It is hereby certified that error appears in the above numbered patent requiring correction and that the said Letters Patent should read as corrected below.

Column 4, line 74, column 5, line 74, column 6, lines 28 and 60, after "cans", each occurrence, insert -- having rims at least on the bottoms thereof --; column 6, lines 34 and 66, after "elements" insert -- supported by a reciprocal carriage to be --.

Signed and sealed this 8th day of October 1963.

(SEAL)
Attest:

ERNEST W. SWIDER            EDWIN L. REYNOLDS
Attesting Officer          Acting Commissioner of Patents